United States Patent
Roberts et al.

(10) Patent No.: US 12,461,802 B1
(45) Date of Patent: Nov. 4, 2025

(54) SYSTEMS AND METHODS FOR EFFICIENTLY IDENTIFYING FAILED COMPUTING NODES

(71) Applicant: Egnyte, Inc., Mountain View, CA (US)

(72) Inventors: Sean Elliott Roberts, Mountain View, CA (US); Ran Simha Biron, Santa Clara, CA (US); Shishir Sharma, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 78 days.

(21) Appl. No.: 18/486,485

(22) Filed: Oct. 13, 2023

Related U.S. Application Data

(60) Provisional application No. 63/416,242, filed on Oct. 14, 2022.

(51) Int. Cl.
*G06F 11/00* (2006.01)
*G06F 11/07* (2006.01)

(52) U.S. Cl.
CPC ........ *G06F 11/0724* (2013.01); *G06F 11/073* (2013.01); *G06F 11/0757* (2013.01)

(58) Field of Classification Search
CPC . G06F 11/0724; G06F 11/073; G06F 11/0757
See application file for complete search history.

(56) References Cited

U.S. PATENT DOCUMENTS

| | | | | |
|---|---|---|---|---|
| 5,031,089 | A * | 7/1991 | Liu | G06F 9/5088 709/201 |
| 6,192,483 | B1 * | 2/2001 | Moiin | G06F 11/1425 714/E11.134 |
| 8,069,366 | B1 * | 11/2011 | Wenzel | G06F 11/2028 714/4.11 |
| 10,203,890 | B1 * | 2/2019 | Lathia | G06F 11/0757 |
| 10,936,224 | B1 * | 3/2021 | Koning | G06F 3/0614 |
| 11,609,913 | B1 * | 3/2023 | Anwar | G06F 11/1464 |
| 2008/0270823 | A1 * | 10/2008 | Hare | G06F 11/0709 714/5.1 |
| 2015/0234846 | A1 * | 8/2015 | Moore | G06F 16/137 707/747 |
| 2017/0017549 | A1 * | 1/2017 | Fukuzumi | G06F 11/0757 |
| 2017/0223115 | A1 * | 8/2017 | Childs | G06F 9/50 |
| 2019/0303233 | A1 * | 10/2019 | Liu | G06F 11/3006 |
| 2020/0410284 | A1 * | 12/2020 | Kallanagoudar | G06F 11/2035 |

(Continued)

*Primary Examiner* — Joshua P Lottich
(74) *Attorney, Agent, or Firm* — Larry E. Henneman, Jr.; Henneman & Associates, PLC

(57) ABSTRACT

Systems and methods for identifying failed computing nodes are disclosed. An example system includes a plurality of computing nodes, where each computing node of the plurality of computing nodes includes, or has access to, at least one hardware processor. An example method includes generating a unique identifier particularly corresponding to a particular node. The example method also includes periodically updating a node record in a persistent storage location with the unique identifier, where the node record is associated with the particular node. The example method further includes accessing the persistent storage location at a first time and identifying a most recent update to the node record. The example method also includes determining that the most recent update to the node record occurred more than a threshold amount of time prior to the first time.

49 Claims, 6 Drawing Sheets

(56) References Cited

U.S. PATENT DOCUMENTS

2021/0342075 A1* 11/2021 Hadav .................. G06F 3/0653
2022/0245091 A1* 8/2022 Batsakis ............... G06F 16/958
2022/0245093 A1* 8/2022 Batsakis ............... G06F 16/144

* cited by examiner

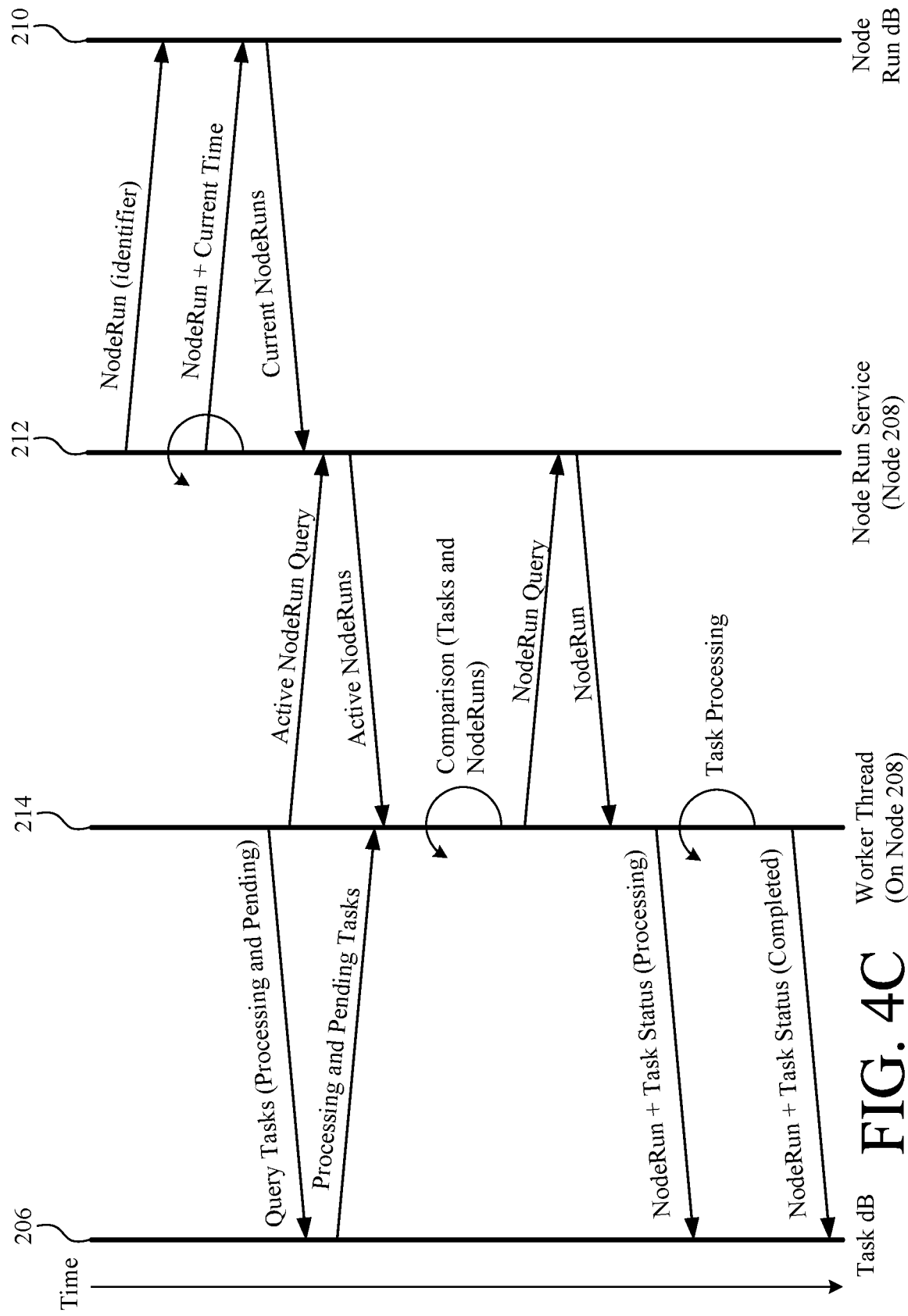

SYSTEMS AND METHODS FOR EFFICIENTLY IDENTIFYING FAILED COMPUTING NODES

RELATED CASES

This application claims the benefit of U.S. Provisional Patent Application No. 63/416,242 filed on Oct. 14, 2022 by at least one common inventor and entitled "Systems and Methods for Efficiently Identifying Failed Computing Nodes", which is incorporated herein by reference in its entirety.

BACKGROUND OF THE INVENTION

Field of the Invention

This invention relates generally to nodal computing environments, and more particularly to identifying failed computing nodes.

Background

In computing environments with multiple nodes it is often desirable to ensure that a unit of work is run once, but only once. One common pattern is to store the status of this work unit in a persistent storage location (e.g. a database) that is visible/accessible to all of the nodes. For example, the status could be indicated by a field with PENDING, PROCESSING, and COMPLETED as possible states. Nodes are free to pick up work units with PENDING status, converting the status to PROCESSING at the time of pick up. If the node completes a work unit, it can update the status to COMPLETED, but, if it encounters an issue, it can revert the status to PENDING. However, nodes may fail in unanticipated ways, such as a loss of power, thus preventing the status from being changed. This failure leaves the work unit in a stuck state; no other nodes will pick it up due to the PROCESSING status, but the underlying node is no longer working on it.

An example solution to the stuck work unit issue incorporates an expiry time with the status field. In other words, if the status is PROCESSING but with an exceeded expiry time, then this work unit can be treated as though it is in a PENDING state and will be free to be picked up by another node. Choosing how to set this expiry time presents a number of issues. The time should be longer than the longest time that the underlying work unit is expected to run. If a work unit is being legitimately worked on, but the time taken exceeds the expiry time, then other nodes could also pick it up, thus violating the constraint that the work unit is run only once. On the other hand, if a node fails without being able to update the status of a work unit it was running, then that work unit is stuck for the remaining duration of the expiry time. These two considerations are at odds with each other. Additionally, the time taken to run a work unit can change over time as the dataset or implementation changes, requiring an expiry time that is tightly specified to be frequently reevaluated.

As an alternative example solution, it is possible to set a short expiry time, and then continuously renew it for a period of time. However, it is desirable for this renewal process to occur at as high a frequency as possible in order to decrease the amount of time that a work unit can be stuck. A higher frequency requires more resources be utilized by the shared data store where the status is stored, and the amount of required resources scales per the number of work units that are being worked on.

SUMMARY

In an illustrative example embodiment, a node run service is created on startup of a node. The node run service produces a unique identifier for the particular run of the particular node, called a "NodeRun". Then it establishes a periodic (e.g., every minute, every five minutes, etc.) job to continuously push the NodeRun and the current time to a set of recent NodeRuns stored in a shared data repository (e.g. a persistent storage location) visible to all nodes. The job additionally pulls this set into a collection stored in memory by the node run service.

In the example embodiment, when a node picks up a task and updates its status to PROCESSING, the node fetches its NodeRun from the node run service and stores it alongside the status. Then, when other processes are validating whether the work unit is stuck, they use the NodeRun associated with that work unit in order to check with their own node run service to ensure that the associated node is still active. If the node is not active, the work unit is reverted to the PENDING state, allowing other nodes to pick up the task again. Alternatively, rather than changing the status of the work unit back to the PENDING state, the process (e.g. a process running on a node) could simply pick up the work unit and substitute its own NodeRun for the NodeRun previously assigned to the work unit. In other words, PROCESSING work units associated with an inactive NodeRun may simply be treated by other processes and/or nodes as PENDING.

In effect, the exclusivity a node has for a specific task expires when its node run service is no longer active, as seen by the node run services running on other nodes. The time it takes for this to occur is primarily governed by the frequency of the node run service's periodic job to update its active NodeRun in the data repository. Advantageously, this time is independent of the time taken for a work unit to run. This means that a work unit can be worked on for a long period of time, but, if the node it is running on fails unexpectedly, then the work unit is stuck for a much shorter period of time. It also means that there is no need to predict for how long the work unit might run, as is required if an expiry time is set up front.

With the node run service approach, the amount of required resources is limited, because only an individual node's active NodeRun's collection is updated frequently. This is true regardless of the number of work units being worked on by that node, as supporting more work units just requires more calls (from the node run service(s) on that node) to the in-memory state of the node run service.

An example method for identifying failed computing nodes is disclosed. The example method includes providing a plurality of computing nodes. Each computing node of the plurality of computing nodes has access to at least one hardware processor and to shared data storage. The example method additionally includes generating a first unique identifier and a second unique identifier. The first unique identifier particularly corresponds to a first particular node of the plurality of computing nodes, and the second unique identifier particularly corresponds to a second particular node of the plurality of computing nodes. The example method additionally includes storing task information in the shared data storage. The task information is indicative of a plurality of computing tasks. Each computing task is available to be completed by one of the plurality of computing nodes. Node information in the shared data storage is periodically updated with new information associated with the first unique identifier. The example method additionally includes accessing the shared data storage at a first time and identifying a most recent update to the node information associated with the first unique identifier in the shared data storage. Then, it can be determined whether the most recent update to the node information associated with the first unique identifier in the shared data storage occurred more than a threshold amount of time prior to the first time. When the most recent update to the node information associated with the first unique identifier in the shared data storage occurred more than a threshold amount of time prior to the first time, it can be concluded that a first task identified by the task information as being processed by the first particular node is no longer being processed by the first particular node. Then, the first task that is concluded to be no longer being processed by the first particular node can be processed with a second particular node of the plurality of computing nodes.

A particular example method additionally includes updating the task information to associate the first task with the second unique identifier, to indicate that the first task is being processed by the second node. The particular example method additionally includes periodically updating the node information in the shared data storage with new information associated with the second unique identifier.

In another particular example method, the step of determining that the most recent update to the node record in the shared data storage occurred more than a threshold amount of time prior to the first time can be performed by the second node of the plurality of computing nodes.

In example methods, the task information can include a plurality of records. Each record can include three or more fields. A first field can include information identifying a particular task. A second field can include information identifying a particular status associated with the particular task identified by the information of the first field. A third field can include information identifying a particular node of the plurality of computing nodes associated with the particular task identified by the information of the first field.

After concluding that the first task is no longer being processed by the first particular node, a record can be written to the task information, wherein the second field can include a status indicating that the first task is available to be processed by another computing node of the plurality of computing nodes. The step of determining and the step of writing the record can be performed by a separate process apart from the first particular node and the second particular node of the plurality of computing nodes.

In an example method, the step of periodically updating the node information can include updating the node information with a new time stamp associated with the first particular node at a predetermined interval. The step of updating the node information with the new time stamp can include overwriting a prior time stamp associated with the first particular node with the new time stamp. Alternatively, the step of updating the node information with the time stamp can include adding an additional node record different from the node record. The additional node record can include the unique identifier and the new time stamp, and the node record can include the unique identifier and a prior time stamp, both records coexisting in the node information.

In example methods the first unique identifier can include information identifying the first particular node and time information indicative of a first particular time. After concluding that the first particular node has failed, the node can be restarted and a new unique identifier particularly corresponding to the first particular node of the plurality of computing nodes can be generated. The node information can then be updated with the new unique identifier. The new unique identifier particularly corresponding to the first particular node can includes the information identifying the first particular node (same as in the first unique identifier) and time information indicative of a second particular time different than the first particular time.

Example multi-node computing systems are also disclosed. An example system includes a plurality of computing nodes. Each computing node of the plurality of computing nodes has access to associated node memory and at least one hardware processor. The node memory stores data and code, and the hardware processor is configured to execute the code. The code includes a set of native instructions configured to cause the hardware processor to perform a corresponding set of native operations when executed by the hardware processor.

The example systems include shared data storage accessible to each node of the plurality of computing nodes. The shared data storage can include task information and node information. The task information can be indicative of a plurality of tasks, each available to be processed by one of the nodes. The node information can be indicative of a status of each of the nodes.

The data and the code associated with a first one of the nodes can include first, second, third, and fourth subsets of the set of native instructions. The first subset of the set of native instructions can be configured to generate a first unique identifier particularly corresponding to the associated first node. The second subset of the set of native instructions can be configured to periodically update the node information in the shared data storage with new information associated with the first unique identifier of the first node. The third subset of the set of native instructions can be configured to determine whether a first task, previously identified by the task information as being processed by another node, is available for processing by the first node. The fourth subset of the set of native instructions can be configured to process the first task when it is determined to be available.

In a particular example system, the third subset of the set of native instructions can be configured to access the shared data storage at a first time, and to identify a most recent update to the node information by the other node. Then, it can be determined whether the most recent update to the node information by the other node occurred more than a threshold amount of time prior to the first time. When the most recent update to the node information by the other node occurred more than the threshold amount of time prior to the first time, it can be concluded that the first task is no longer being processed by the other node.

Another example system can include a third node that monitors the node information to identify failed nodes. The third node can be configured to access the shared data storage at a first time, and to identify a most recent update to the node information by the other node. The third node then determines whether the most recent update to the node information by the other node occurred more than a threshold amount of time prior to the first time. Then the most recent update to the node information by the other node occurred more than the threshold amount of time prior to the first time, the third node can conclude that the first task is no longer being processed by the other node. Then, the third node can update a status identifier in the task information to indicate that the first task is available for processing. The third subset of the set of native instructions of the first node can be configured to determine whether the first task is available for processing by the first node by checking the status identifier updated by the third node.

In example systems, the task information can include a plurality of records. Each record can include at least a first field, a second field, and a third field. The first field can include information identifying a particular task. The second field can include information identifying a particular status associated with the particular task identified by the information of the first field. The third field can include information identifying a particular node of the plurality of computing nodes associated with the particular task identified by the information of the first field.

In particular example systems, the second subset of the set of native instructions can be configured to periodically update the node information by storing new time information associated with the first node by the first unique identifier in the node information. Storing the new time information can include overwriting previous time information associated with the first node by the first unique identifier in the node information. Alternatively, storing the new time information can include storing the new time information in the node information such that the updated node information includes previous time information and the new time information associated with the first node by the first unique identifier.

Example unique identifiers are disclosed. In an example system, the first unique identifier includes information identifying the first node, and time information indicative of a first time. Upon restart of the first node, the first subset of the set of native instructions can be configured to generate a new unique identifier particularly corresponding to the associated first node. The new unique identifier can include the same information identifying the first node in combination with new time information indicative of a second time different than the first time.

An example computing node of a multi-node computing system is also disclosed. The example computing node includes a hardware processor and memory. The memory can store data and code. The code can include a set of native instructions configured to cause the hardware processor to perform a corresponding set of native operations when executed by the hardware processor. The example computing node also includes an interface to shared memory. The shared memory can be accessible to other computing nodes of the multi-node computing system. The data and the code of the example computing node can include first, second, third, and fourth subsets of the set of native instructions. The first subset of the set of native instructions can be configured to generate a first unique identifier particularly corresponding to the example computing node. The second subset of the set of native instructions can be configured to periodically update node information in the shared memory with new information associated the first unique identifier of the computing node. The third subset of the set of native instructions can be configured to determine whether a first task, previously identified by task information in the shared memory as being processed by another node, is available for processing by the computing node. The fourth subset of the set of native instructions can be configured to process the first task when it is determined to be available.

BRIEF DESCRIPTION OF THE DRAWINGS

The present invention is described with reference to the following drawings, wherein like reference numbers denote substantially similar elements:

FIG. 4C is a timing diagram illustrating a method for processing a task from a group including tasks assigned to potentially failed nodes.

DETAILED DESCRIPTION

The present invention overcomes the problems associated with the prior art, by providing systems and methods for distributing work units between nodes of a nodal computing system, while minimizing/reducing the time that a work unit is assigned to a failed node. In the following description, numerous specific details are set forth (e.g., particular system architecture, database structures, etc.) in order to provide a thorough understanding of the invention. Those skilled in the art will recognize, however, that the invention may be practiced apart from these specific details. In other instances, details of well-known computing practices (e.g., routine optimization, database APIs, etc.) and components have been omitted, so as not to unnecessarily obscure the present invention.

Figure 1:
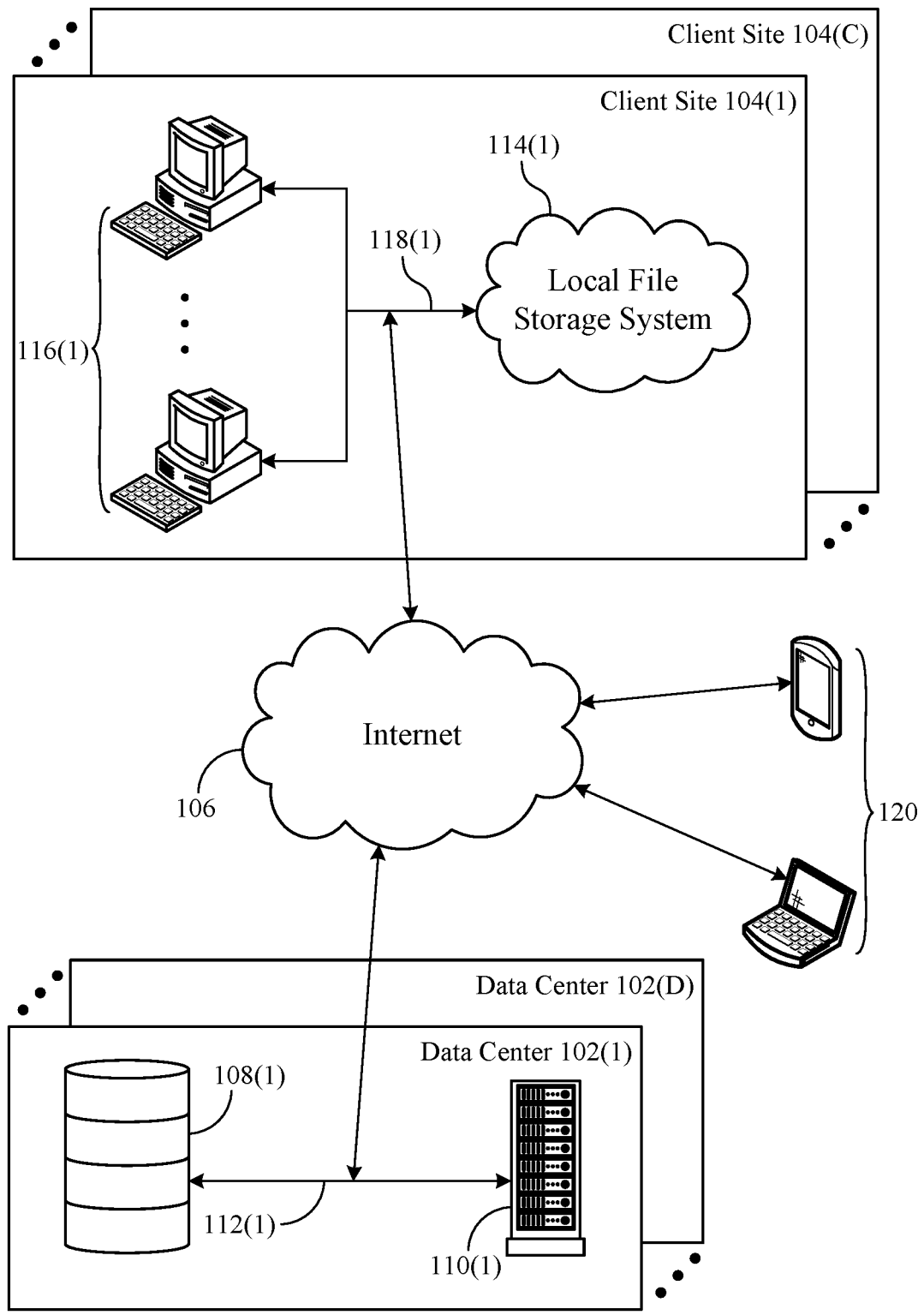
FIG. 1 is a block diagram showing a plurality of client sites connected to a plurality of data centers via the Internet.

FIG. 1 shows a cloud computing system 100, including data centers 102(1-D) and client sites 104(1-C), which are interconnected and communicate via an internetwork, for example the Internet 106. Data centers 102 are operated by a cloud service provider (e.g. a company or other juristic entity) to provide cloud computing services, such as data storage, remote data access, software as a service, platform as a service, infrastructure as a service, and so on, to various clients associated with client sites 104. Data centers 102 can be located geographically remotely from one another, including on separate continents, in order to provide efficient services to clients in various geographic locations.

Each of data centers 102 includes client data storage 108 and servers 110. In the example embodiment, client data storage 108 includes non-volatile storage that stores data associated with client sites 104. In the example embodiment, data storage 108 includes a mix of hard disk drives (HDDs) and/or solid state drives (SSDs), however, in alternate embodiments, data storage 108 can include any storage medium configured to receive, store, and/or transfer data. Servers 110 include at least working memory, a processing unit, and a network interface. Servers 110 are connected to data storage 108 and the Internet 106 via a local network 112 and utilize these connections to perform tasks related to client data stored in storage 108. As an illustrative example, one of servers 110 may handle a request to synchronize a particular item stored in client data storage 108 by fetching the newest version of the item over Internet 106 and storing it in place of the older version. Together, client data storage 108 and servers 110 receive, store, maintain, alter, delete, archive, and/or transfer client data at the direction of users, clients, and/or administrators of data centers 102 and/or client sites 104.

Client sites 104 are associated with various clients of the aforementioned cloud service provider. In the example embodiment, each of client sites 104 is associated with a separate client, where each of the clients is unaffiliated with the others (e.g., separate juristic entities that require and/or maintain confidentiality of data with respect to one another). In alternate embodiments, some of the clients may be associated with multiple of client sites 104, or all of client sites 104 may be associated with a single entity. In yet another alternative embodiment, all of data centers 102 and client sites 104 may be owned and operated by a single entity in an enterprise configuration. In such a configuration, Internet 106 can be replaced by another network, such as a private wide area network. In yet another alternative, the components of data centers 102 and client sites 104 may be co-located, wherein Internet 106 is replaced by a local area network. These and other alternatives will be apparent to those skilled in the art in view of the present disclosure.

Client sites 104 include a local file storage system 114 and local clients 116 interconnected via a local network 118. Local file storage system 114 includes at least one network-attached storage (NAS) device, which is configured to store local client data (e.g., files, folders, software, configuration data, etc.). In the example embodiment, local file storage system 114 includes a local file system comprising files and folders organized in a hierarchical directory. Local clients 116 may access local file storage system 114 via local network 118, in order to access and/or alter files and folders of the local file system. In the example embodiment, at least a portion of the local file system is bi-directionally synchronized with a remote file system stored on client data storage 108. Changes made to a portion of the local file system are propagated to the remote file system and applied there, to maintain synchronization between the file systems. Similarly, any changes made to a synchronized portion of the remote file system are propagated to the local file storage system and applied there.

Bi-directional synchronization of the file systems stored on local file storage system 114 and client storage 108 allows for remote access to the synchronized portion of the file systems. Remote clients 120 can access the remote file system stored on client data storage 108 via Internet 106. Remote clients 120 include computing devices located geographically remotely from data centers 102, but that have the capability and authorization to access data over Internet 106. Remote clients 120 can include, but are not limited to, smartphones, laptop computers, desktop computers, etc.

Figure 2:
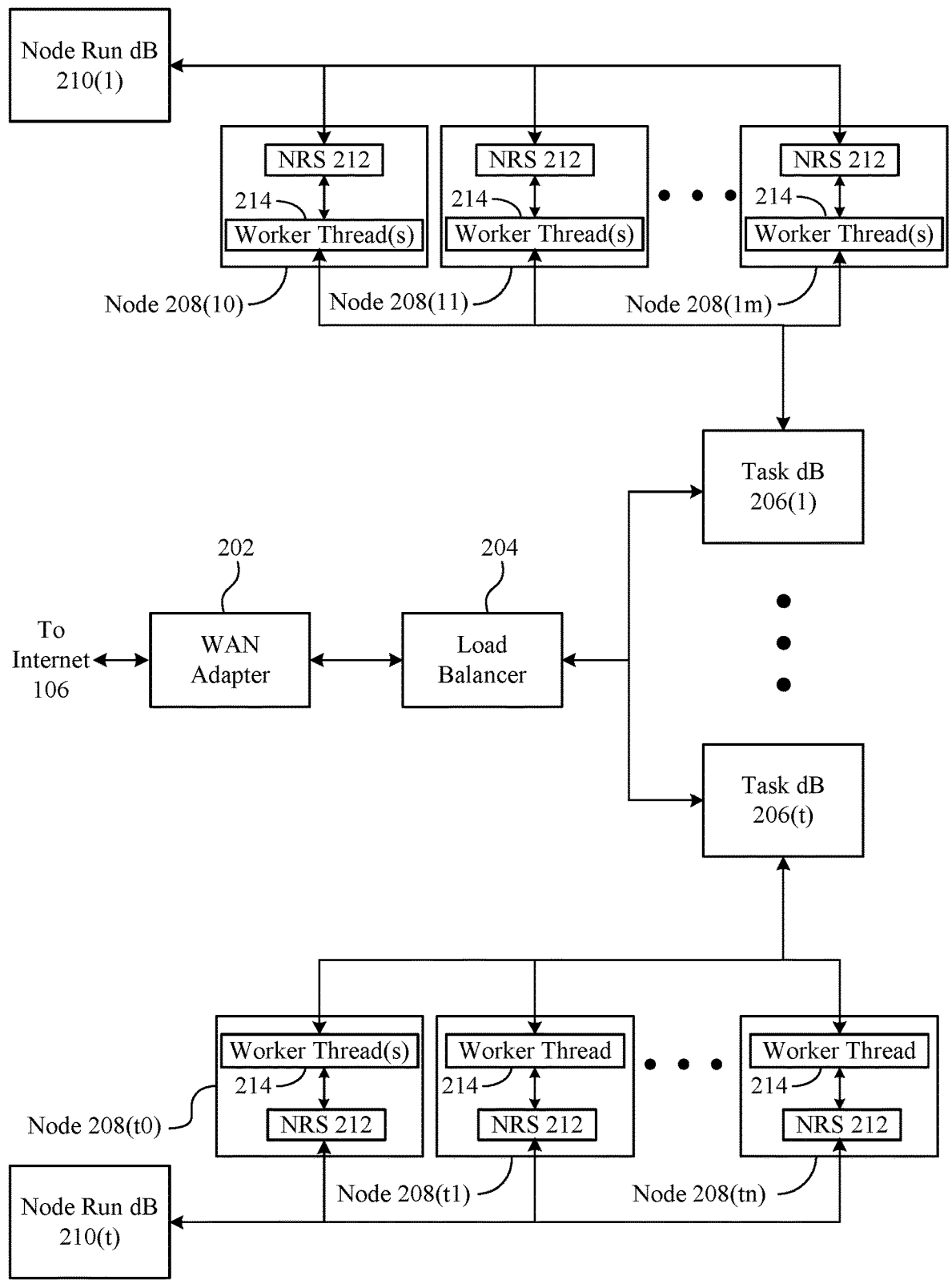
FIG. 2 is a block diagram showing a data center of FIG. 1 in greater detail.

FIG. 2 shows a portion of data center 102 in greater detail. Data center 102 includes a wide-area network (WAN) adapter 202, a load balancer 204, a plurality of task databases (dBs) 206, a plurality of nodes 208, and a plurality of node run dBs 210. WAN adapter 202 is electrically coupled to establish a network connection with Internet 106, through which changes to the file systems may be propagated between data centers 102 and client sites 104. Incoming messages are received by WAN adapter 202, processed (e.g. to remove protocol headers, footers, etc.), and provided to load balancer 204. Load balancer 204 analyzes incoming messages and determines to which of task databases 206 each message should be allocated. Load balancer 204 may allocate messages based on one or more workload distribution functions including, but not limited to, asymmetric distribution, workload prioritization, and/or content-aware distribution.

Task dBs 206 (1-$t$) include a plurality of databases (1-$t$), each including a list of tasks derived, for example, from incoming messages. In the example embodiment, each task is a unit of work to be accomplished by one of nodes 208. In alternative embodiments a task could be, by way of non-limiting example, a process, a lightweight process, a thread, a step, a request, a query, a unit computation, a process step, etc. Each of task dBs 206(1-$t$) is associated with a plurality of nodes 208. In particular, task dB 206(1) is associated with nodes 208(10-1$m$), where nodes 208(10-1$m$) may process tasks from database 206(1), and task dB 206($t$) is associated with nodes 208($t$0-$tn$), where nodes 208($t$0-$tn$) may process tasks from database 206($t$). In alternative embodiments, there may be a single task dB that is utilized by all nodes. In yet another alternative embodiment, nodes and task databases may be created or eliminated as needed via horizontal scaling in order to more efficiently utilize computing resources.

Nodes 208 provide the computing resources to process and complete tasks. In the example embodiment, a node is a server including at least one physical core of a hardware processor and some type of data storage. However, in alternative embodiments, nodes can be, by way of non-limiting examples, virtual servers, virtual machines, or any other type of virtual/physical processing devices with access to onsite/offsite physical memory, virtual memory, and/or volatile/nonvolatile storage. Each of nodes 208 includes a node run service (NRS) 212 and one or more worker threads 214. Each instance of NRS 212 interacts with one of node run dBs 210, in order to track and update node statuses. Each instance of worker thread 214 interacts with one of task dBs 206 to track and update task processing. On startup of a node, NRS 212 provides a "NodeRun" to node run dB 210. The NodeRun is a unique identifier that corresponds to a particular instantiation of one of nodes 208 and allows each of nodes 208 to identify others of nodes 208 in both task dB 206 and node run dB 210. NRS 212 also periodically provides the NodeRun and a current timestamp to node run dB 210. When selecting tasks to process from task dB 206, worker threads 214 can query NRS 212, which can utilize the list of timestamped NodeRuns to determine whether another node has failed, so worker threads 214 can determine whether the status of a task associated with the failed node should be changed from "PROCESSING" to "PENDING" or whether a task with a "PROCESSING" status may be picked up and worked on. In this way, task dB 206, node run dB 210, NRS 212, and worker threads 214 allow for the efficient processing of tasks, even in the event of unexpected node failure(s). These aspects of the present example embodiment will be discussed in more detail with respect to FIGS. 3-4C below.

Figure 3:
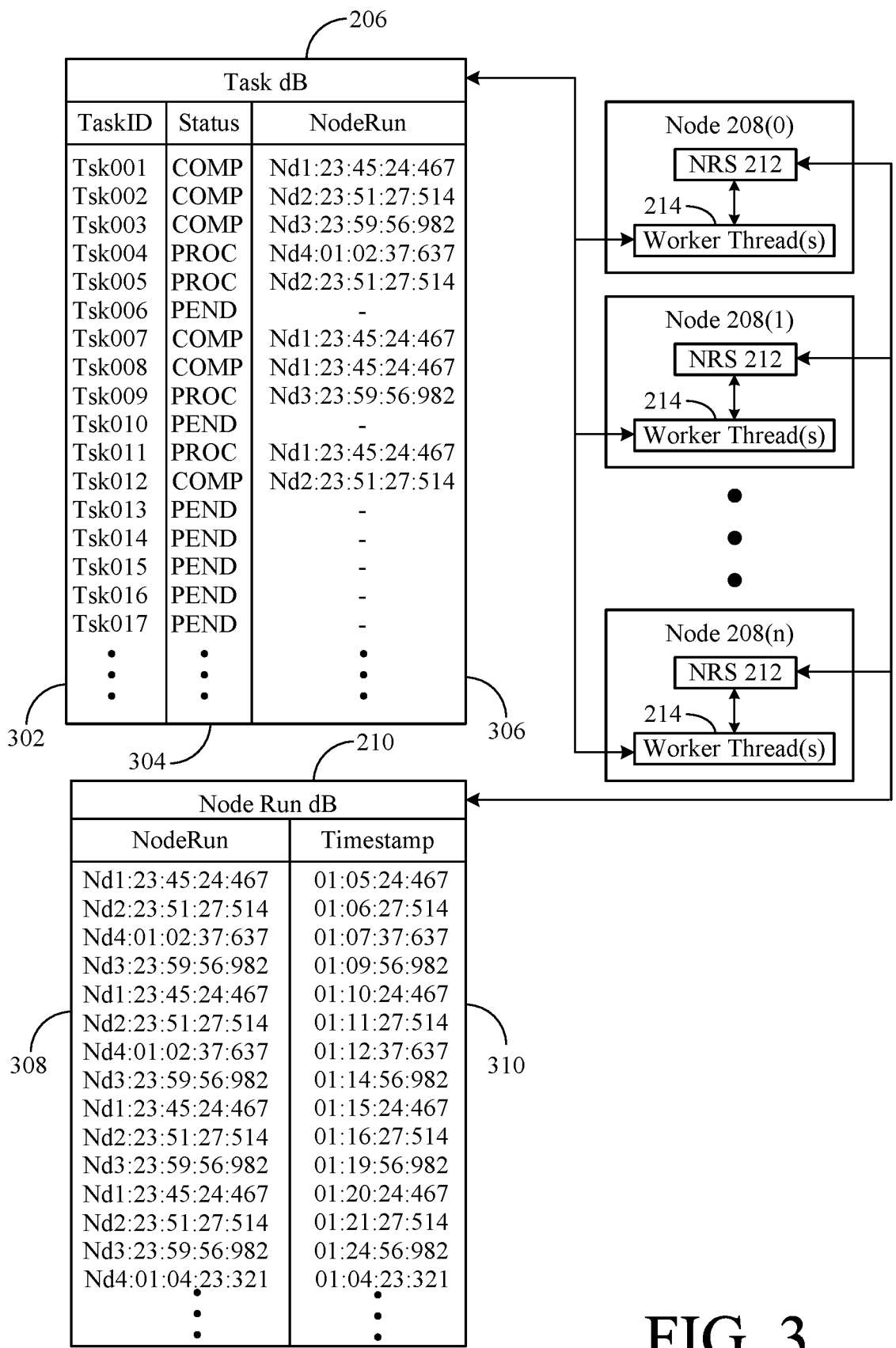
FIG. 3 is a block diagram showing a portion of FIG. 2 in greater detail.

FIG. 3 shows one of task dBs 206, a group of nodes 208 (1-$n$), and one of node run dBs 210 in greater detail. For clarity, the following discussion will be in reference to a subset of nodes 208 (1-$n$), associated with a single task dB 206 and a single node run dB 210. The records of task dB 206 each include a task ID field 302, a status field 304, and a NodeRun field 306. Task ID field 302 includes a unique identifier identifying an individual task, which might be accomplished by any one of nodes 208. Status field 304 includes a status indicator indicating the status of an associated task identified by a corresponding task identifier entry of the same record. NodeRun field 306 includes a "NodeRun" value, which is a unique identifier identifying a particular instantiation of an individual one of nodes 208, upon which worker threads 214 might be performing, or have performed, work on an associated task identified by the corresponding task identifier entry in the same record.

In the example embodiment, a first record of task dB 206 includes "Tsk001" in task ID field 302, "COMP" in status field 304, and "Nd1:23:45:24:467" in NodeRun field 306. "Tsk001" is the identifier that uniquely identifies the particular task. "COMP" indicates that the task was completed. "Nd1:23:45:24:467" indicates that "node 1", which was instantiated at 23:45:24.467, is the node that completed the task. The entry in NodeRun field 306 includes the NodeRun that is utilized by NRSs 212 to identify and monitor this particular instantiation of node 1. In alternate embodiments, the NodeRun may be generated through alternate means, including, but not limited to, random number generation, assigning incremental values to successive nodes, and so on.

Each record of node run dB 210 corresponds to a periodic timestamp update from one of nodes 208 and includes an entry in a NodeRun field 308 and an entry in a timestamp field 310. NodeRun field 308 includes data that identifies a particular instantiation of one of nodes 208. Timestamp field 310 includes timestamp information indicative of one of the periodic updates performed by NRS 212. In the example embodiment, the node corresponding to NodeRun "Nd1:23:45:24:467" provides periodic updates at 01:05:24.467, 01:10:24.467, 01:15:24.467, and 01:20:24.467, i.e., every five minutes. In alternative embodiments, the NRSs 212 may provide periodic updates at longer or shorter intervals, as deemed desirable for particular applications. The update interval can be adjusted as needed, based on a multitude of factors including, but not limited to, the frequency of node failure, the average length of tasks, the number of available nodes, the number of pending tasks, the amount of available memory, and so on. In addition, the updates may not occur exactly on the expected interval (e.g., down to the millisecond), rather the updates may occur within some acceptable time range of the interval (e.g., within a second before/after the interval, within five seconds before/after the interval, or any other applicable time range). In determining whether a particular node is still active, the time difference between a current time and the time indicated in the last update by the particular node is particularly relevant.

In this particular example, node run dB 210 includes accumulating records, to facilitate clear explanation. However, in an alternate embodiment that requires far less memory resources, the records of node run dB 210 can be updated instead of accumulated. In particular, each time an active node reports, a record associated with the corresponding NodeRun can be updated by overwriting the previous time stamp with the newly reported time stamp. Thus, the number of records in node run dB 210 can be minimized and memory requirements relaxed.

Figure 4A:
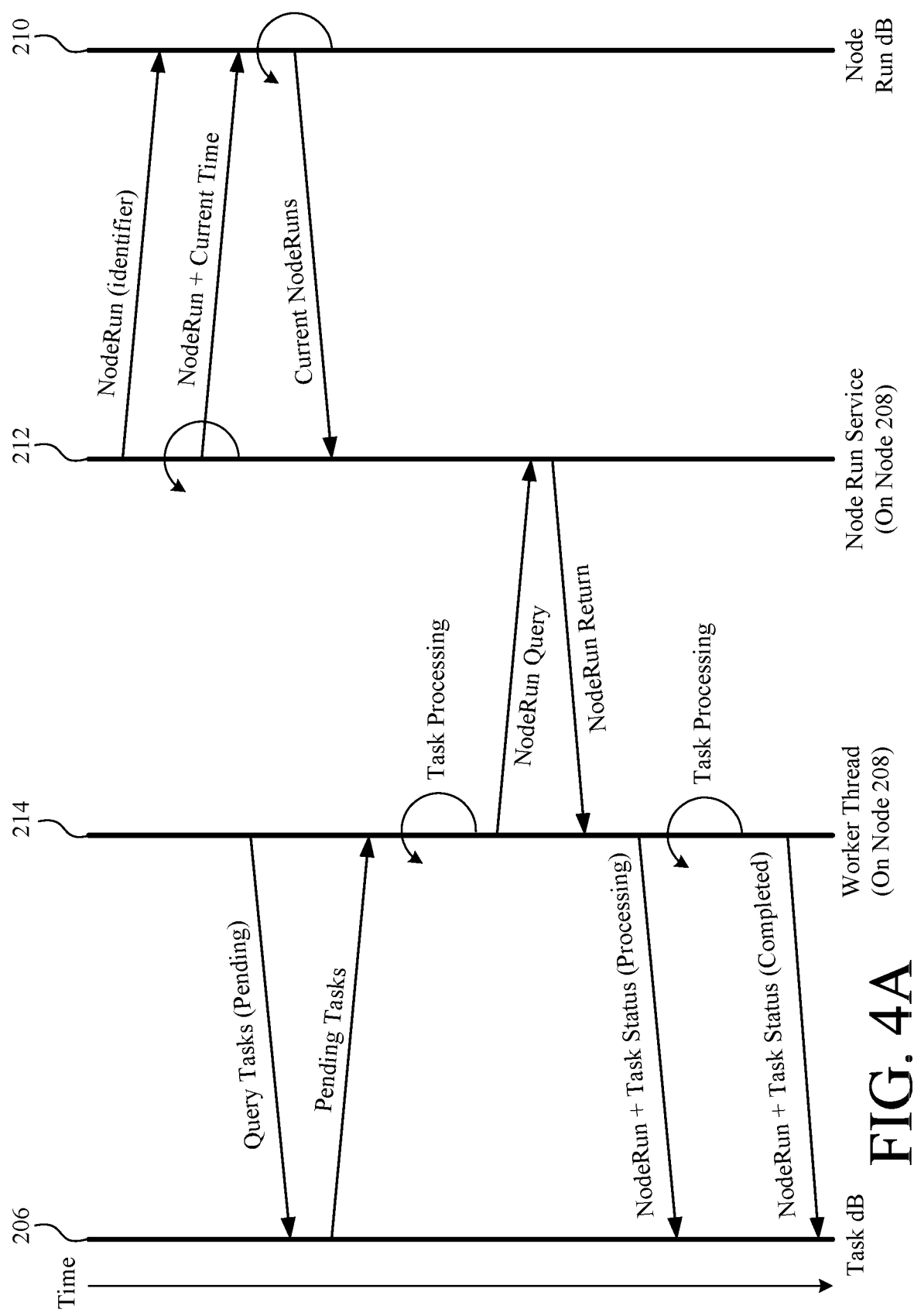
FIG. 4A is a timing diagram illustrating a method for processing a pending task.

FIG. 4A is a timing diagram illustrating one example of the functionality of NRS 212 in relation to task dB 206, node run dB 210, and a worker thread 214 running on node 208. Upon launch of node 208, NRS 212 provides a newly generated NodeRun to node run dB 210. Thereafter, NRS 212 periodically provides, according to a predetermined time interval, the NodeRun and a current time stamp to node run dB 210. NRS 212 also periodically receives a list of other NodeRuns with recently updated time stamps (e.g., a copy or a relevant portion of node run dB 210) corresponding to other nodes, which it stores in an associated working memory (not shown).

In this example, the NodeRun includes an identifier associated with the node 208 and a time stamp associated with the launch of node 208. Using the timestamp in conjunction with the node identifier facilitates identification of the situation where a node goes down while performing tasks, but rapidly relaunches (without previously running worker threads). In that case, the original NodeRun will not match the NodeRun of the relaunched node. Thus, other nodes will be able to determine that the original instantiation of the node has failed and, therefore, that the tasks being worked on by the prior worker threads are stuck.

In order to identify an available task, worker thread 214 queries task dB 206 for tasks with the status PENDING. Worker thread 214 queries task dB 206 and receives a pending task list. Worker thread 214 also queries NRS 212 and receives the NodeRun associated with node 208. Worker thread 214 then selects a pending task, based at least in part on some predetermined prioritization criteria (e.g., the oldest task, task with highest priority level, some combination of factors, etc.), and returns the NodeRun and a request to alter the selected task's status from "PENDING" to "PROCESSING". Task dB 206 updates the task's status, and node 208 proceeds to process the selected task. During task processing, NRS 212 continues to periodically provide the NodeRun and an updated timestamp to node run dB 210, so other nodes can determine that there has not been a failure of the current node and the task is still being processed. Upon completion of the task, NRS 212 provides a request to alter the selected task's status from "PROCESSING" to "COMPLETE". Once the task is complete, worker thread 214 is then free to pick up another task, shut down, etc.

Although the NodeRun should not have changed since worker thread 214 was instantiated, querying NRS 212 for the NodeRun before worker thread 214 updates a status of a task on task dB 206 enables NRS 212 to prevent worker thread 214 from picking up a task in certain circumstances. For example, if NRS 212 loses communication with node run dB 210, then NRS 212 cannot determine which other nodes might have failed. In that case, NRS 212 can return an exception to worker thread, causing worker thread 214 to not pick up a new task until communication with node run dB is reestablished, or to pick up only pending tasks, or any action task that does not depend on the statuses of the other nodes.

Figure 4B:
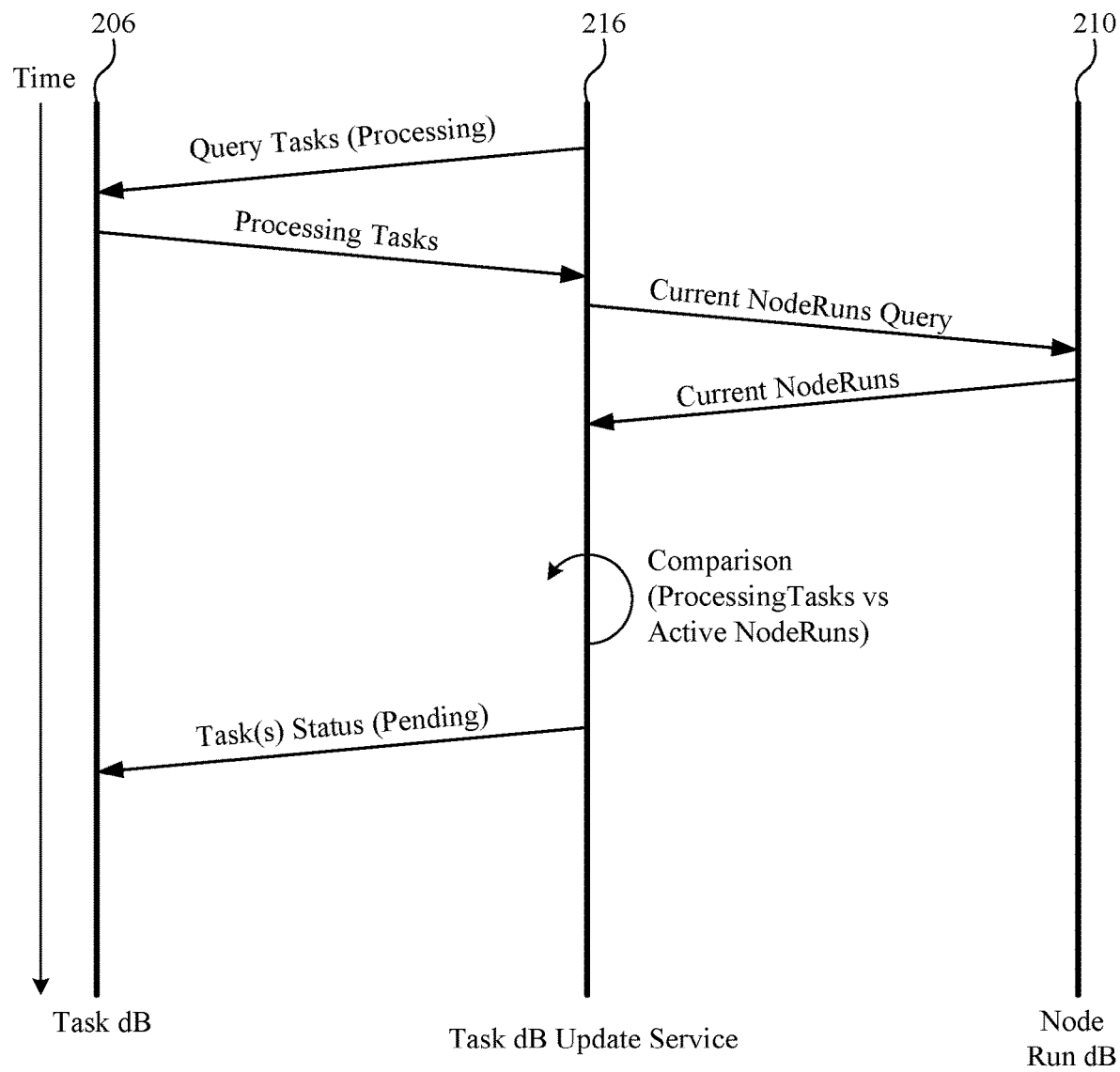
FIG. 4B is a timing diagram illustrating a method for identifying a failed node.

FIG. 4B is a timing diagram illustrating the functionality of a task dB update service 216. In this case, update service 216 utilizes node run dB 210 to identify failed nodes assigned to "PROCESSING" tasks. First, update service 216 queries task dB 206 for tasks labeled "PROCESSING" and queries node run dB 210 for current NodeRuns and timestamps. Then update service 216 compares the received tasks with the list of NodeRuns and timestamps to determine whether any of the tasks are associated with nodes that have failed. For any tasks assigned to a failed node, Update service 216 can send a request to task dB 206 to alter the status of that node from "PROCESSING" to "PENDING", so that another node may pick up that task and complete it.

To better understand the process summarized in FIG. 4B, make reference to FIG. 3 for the following discussion. As an example, one of nodes 208 may determine whether any of tasks 004, 005, 009, or 011 are tied up by a failed node. In the example, task 004 is assigned to node 4. To determine whether node 4 is operational, NRS 212 analyzes entries to node run dB 210. For example, NRS 212 can access a portion of, or data based on, node run dB 210 stored in local memory of node 208. In the example, node 4 has provided two updated timestamps, one at 01:07:37.637 and another at 01:12:37.637, but failed to provide any additional timestamps, while the other nodes continued to do so. Therefore, node 4 can be determined to have most likely failed, and NRS 212 should request that task dB 206 revert the status of task 4 to "PENDING".

The last record in node run dB 210 shows that when node 4 restarted, it generated a new NodeRun (Nd4:01:04:23:321). Therefore, even though node 4 will continue to post time stamps in node run dB 210, there will be no additional time stamps from the original NodeRun from node 4 (Nd4:01:02:37:637). Thus, other NRSs will be able to determine that the original NodeRun on node 4 has failed, and the new NodeRun on node 4 is active.

In the example of FIG. 4B, task dB update service 216 can function as both the task dB update service (described above) and NRS 212. Thus, task dB update service 216 can interact directly with node run dB 210. In other words, the functionality of task dB update service 216 can be built into NRS 212. Alternatively, task dB update service 216 might not include the functionality of NRS 212, but maintain the ability to communicate directly with node run dB 210, to be able to run independently on a node without NRS 212. As yet another option, the functionality of task dB update service 216 can be included in a dedicated worker thread 214, which would query NRS 212 for node statuses, as described above, instead of communicating directly with Node Run dB 210.

The relative timing between querying/receiving the PROCESSING tasks and querying/receiving the current NodeRuns is not critical, as long as they occur close enough in time so that both can be considered valid. For example, the tasks labeled "PROCESSING" could be received just prior, just after, or at the same time that the current NodeRuns are received.

FIG. 4C is a timing diagram illustrating another example of the functionality of NRS 212 and worker thread 214. In the example of FIG. 4C, worker thread 214 can pick up a task from task dB 206 that is associated with a failed node, even if that task still has a PROCESSING status label. First, upon instantiation of the corresponding node 208, NRS 212 provides its NodeRun to node run dB 210, and then continues to periodically provide the NodeRun along with associated timestamps for as long as node 208 is operational. NRS 212 also periodically fetches/receives the updated NodeRuns and timestamps of other nodes from node run dB 210 (e.g. in response to providing its own NodeRun and timestamp each time). In order to identify a task for completion, worker thread 214 queries task dB 206 for all tasks labeled "PROCESSING" or "PENDING". Worker thread 214 also queries NRS 212 to determine which NodeRuns correspond to active nodes. Depending on the status of the highest priority task, NRS 212 may compare the list of tasks with the status(es) of NodeRuns received from NRS 212. Upon identifying a task that is labeled either "PENDING" or "PROCESSING" but assigned to a failed node (i.e., a task that worker thread 214 intends to pick up), worker thread 214, for reasons explained above with respect to FIG. 4A, queries NRS 212 and receives its NodeRun. Then, worker thread 214 provides its own NodeRun and requests that task dB 206 update the record corresponding to the identified task to associate the task with the provided NodeRun and to indicate that the task is being processed. Next, worker thread 214 processes the identified task and, upon completion, again provides its NodeRun along with a request that task dB 206 update the status of the completed task to "COMPLETED". Once the task is complete, worker thread 214 is then free to pick up another task, shut down, etc.

The relative timing of the queries and returns shown in FIG. 4C is not critical, as long as the returned data is valid for the Comparison operation. For example, worker thread 214 could query NRS 212 for the NodeRun as soon as the worker thread is initiated and before performing any of the other queries or tasks.

In the example process of FIG. 4C, worker thread 214 receives all pending and processing tasks and all NodeRuns corresponding to recently active nodes before performing the comparison operation. In an alternate process, worker thread 214 can fetch one or more of the processing and pending tasks, and then query NRS 212 for the status of particular ones of the NodeRuns associated with the fetched tasks.

The description of particular embodiments of the present invention is now complete. Many of the described features may be substituted, altered or omitted without departing from the scope of the invention. For example, the node run service is presented as providing a variety of functionalities. However, in alternate embodiments, the functionality of the node run service could be provided by a plurality of separate services, software modules, hardware modules, firmware modules, or any combination thereof. As another example, instead of using a relational database as shown in the examples, an in-memory data store (e.g., open source Redis, etc.) could be used. These and other deviations from the particular embodiments shown will be apparent to those skilled in the art, particularly in view of the foregoing disclosure.

We claim:

1. A method for identifying failed computing nodes, said method comprising:
   providing a plurality of computing nodes, each computing node of said plurality of computing nodes having access to at least one hardware processor and to shared data storage;
   generating a first unique identifier particularly corresponding to a first particular node of said plurality of computing nodes;
   generating a second unique identifier particularly corresponding to a second particular node of said plurality of computing nodes;
   storing task information in said shared data storage, said task information indicative of a plurality of computing tasks each available to be completed by one of said plurality of computing nodes;
   periodically updating node information in said shared data storage with new information associated with said first unique identifier;
   accessing said shared data storage at a first time;
   identifying a most recent update to said node information associated with said first unique identifier in said shared data storage;
   determining whether said most recent update to said node information associated with said first unique identifier in said shared data storage occurred more than a threshold amount of time prior to said first time;
   concluding, when said most recent update to said node information associated with said first unique identifier in said shared data storage occurred more than a threshold amount of time prior to said first time, that a first task identified by said task information as being processed by said first particular node is no longer being processed by said first particular node; and
   processing said first task that is concluded to be no longer being processed by said first particular node with a second particular node of said plurality of computing nodes; and wherein
   said step of determining that said most recent update to said node record in said shared data storage occurred more than a threshold amount of time prior to said first time is performed by said second node of said plurality of computing nodes.

2. The method of claim 1, further comprising:
   updating said task information to associate said first task with said second unique identifier to indicate said first task is being processed by said second node; and periodically updating said node information in said shared data storage with new information associated with said second unique identifier.

3. The method of claim 1, wherein said task information includes a plurality of records, each record including:
   a first field including information identifying a particular task;
   a second field including information identifying a particular status associated with said particular task identified by said information of said first field; and
   a third field including information identifying a particular node of said plurality of computing nodes associated with said particular task identified by said information of said first field.

4. The method of claim 3, further comprising:
   after concluding that said first task is no longer being processed by said first particular node, writing a record to said task information wherein said second field includes a status indicating that said first task is available to be processed by another computing node of said plurality of computing nodes; and
   said step of determining and said step of writing said record are performed by a separate process apart from said first particular node and said second particular node of said plurality of computing nodes.

5. The method of claim 1, wherein said step of periodically updating said node information includes updating said node information with a new time stamp associated with said first particular node at a predetermined interval.

6. The method of claim 5, wherein said step of updating said node information with said new time stamp includes overwriting a prior time stamp associated with said first particular node with said new time stamp.

7. The method of claim 5, wherein said step of updating said node information with said new time stamp includes adding an additional node record different from said node record, said additional node record including said unique identifier and said new time stamp, and said node record including said unique identifier and a prior time stamp.

8. The method of claim 1, wherein said first unique identifier includes:
   information identifying said first particular node; and
   time information indicative of a first particular time.

9. The method of claim 8, further comprising:
   after said step of concluding, generating a new unique identifier particularly corresponding to said first particular node of said plurality of computing nodes; and
   updating said node information with said new unique identifier; and wherein
   said new unique identifier particularly corresponding to said first particular node includes said information identifying said first particular node and time information indicative of a second particular time different than said first particular time.

10. A multi-node computing system, comprising:
    a plurality of computing nodes, each computing node of said plurality of computing nodes having access to associated node memory, for storing data and code, and at least one hardware processor configured to execute said code, said code including a set of native instructions configured to cause said at least one hardware processor to perform a corresponding set of native operations when executed by said at least one hardware processor; and
    shared data storage accessible to each node of said plurality of computing nodes, said shared data storage including task information and node information, said task information indicative of a plurality of tasks each available to be processed by one of said nodes, said node information indicative of a status of each of said nodes; and wherein
    said data and said code associated with a first one of said nodes include
      a first subset of said set of native instructions configured to generate a first unique identifier particularly corresponding to said associated first node,
      a second subset of said set of native instructions configured to periodically update said node information in said shared data storage with new information associated with said first unique identifier of said first node,
      a third subset of said set of native instructions configured to determine whether a first task, previously identified by said task information as being processed by another node, is available for processing by said first node, and
      a fourth subset of said set of native instructions configured to process said first task when it is determined to be available; and
    said task information includes a plurality of records, each record including
      a first field including information identifying a particular task,
      a second field including information identifying a particular status associated with said particular task identified by said information of said first field, and
      a third field including information identifying a particular node of said plurality of computing nodes associated with said particular task identified by said information of said first field.

11. The system of claim 10, wherein said third subset of said set of native instructions is configured to:
    access said shared data storage at a first time;
    identify a most recent update to said node information by said another node;
    determine whether said most recent update to said node information by said another node occurred more than a threshold amount of time prior to said first time; and
    conclude, when said most recent update to said node information by said another node occurred more than said threshold amount of time prior to said first time, that said first task is no longer being processed by said another node.

12. The system of claim 10, wherein:
    said system includes a third node configured to
      access said shared data storage at a first time,
      identify a most recent update to said node information by said another node,
      determine whether said most recent update to said node information by said another node occurred more than a threshold amount of time prior to said first time,
      conclude, when said most recent update to said node information by said another node occurred more than said threshold amount of time prior to said first time, that said first task is no longer being processed by said another node, and
      update a status identifier in said task information to indicate that said first task is available for processing; and
    said third subset of said set of native instructions is configured to determine whether said first task is available for processing by said first node by checking said updated status identifier.

13. The system of claim 10, wherein said second subset of said set of native instructions is configured to periodically update said node information by storing new time information associated with said first node by said first unique identifier in said node information.

14. The system of claim 13, wherein said storing new time information includes overwriting previous time information associated with said first node by said first unique identifier in said node information.

15. The system of claim 13, wherein said storing said new time information includes storing said new time information in said node information such that said updated node information includes previous time information and said new time information associated with said first node by said first unique identifier.

16. The system of claim 10, wherein said first unique identifier includes:
  information identifying said first node; and
  time information indicative of a first time.

17. The system of claim 16, wherein, upon restart of said first node, said first subset of said set of native instructions is configured to generate a new unique identifier particularly corresponding to said associated first node, said new unique identifier including:
  said information identifying said first node; and
  new time information indicative of a second time different than said first time.

18. A method for identifying failed computing nodes, said method comprising:
  providing a plurality of computing nodes, each computing node of said plurality of computing nodes having access to at least one hardware processor and to shared data storage;
  generating a first unique identifier particularly corresponding to a first particular node of said plurality of computing nodes;
  generating a second unique identifier particularly corresponding to a second particular node of said plurality of computing nodes;
  storing task information in said shared data storage, said task information indicative of a plurality of computing tasks each available to be completed by one of said plurality of computing nodes;
  periodically updating node information in said shared data storage with new information associated with said first unique identifier;
  accessing said shared data storage at a first time;
  identifying a most recent update to said node information associated with said first unique identifier in said shared data storage;
  determining whether said most recent update to said node information associated with said first unique identifier in said shared data storage occurred more than a threshold amount of time prior to said first time;
  concluding, when said most recent update to said node information associated with said first unique identifier in said shared data storage occurred more than a threshold amount of time prior to said first time, that a first task identified by said task information as being processed by said first particular node is no longer being processed by said first particular node; and
  processing said first task that is concluded to be no longer being processed by said first particular node with a second particular node of said plurality of computing nodes; and wherein
  said task information includes a plurality of records, each record including a first field including information identifying a particular task,
  a second field including information identifying a particular status associated with said particular task identified by said information of said first field, and
  a third field including information identifying a particular node of said plurality of computing nodes associated with said particular task identified by said information of said first field.

19. The method of claim 18, further comprising:
  updating said task information to associate said first task with said second unique identifier to indicate said first task is being processed by said second node; and
  periodically updating said node information in said shared data storage with new information associated with said second unique identifier.

20. The method of claim 18, further comprising:
  after concluding that said first task is no longer being processed by said first particular node, writing a record to said task information wherein said second field includes a status indicating that said first task is available to be processed by another computing node of said plurality of computing nodes; and
  said step of determining and said step of writing said record are performed by a separate process apart from said first particular node and said second particular node of said plurality of computing nodes.

21. The method of claim 18, wherein said step of periodically updating said node information includes updating said node information with a new time stamp associated with said first particular node at a predetermined interval.

22. The method of claim 21, wherein said step of updating said node information with said new time stamp includes overwriting a prior time stamp associated with said first particular node with said new time stamp.

23. The method of claim 21, wherein said step of updating said node information with said new time stamp includes adding an additional node record different from said node record, said additional node record including said unique identifier and said new time stamp, and said node record including said unique identifier and a prior time stamp.

24. The method of claim 18, wherein said first unique identifier includes:
  information identifying said first particular node; and
  time information indicative of a first particular time.

25. The method of claim 24, further comprising:
  after said step of concluding, generating a new unique identifier particularly corresponding to said first particular node of said plurality of computing nodes; and
  updating said node information with said new unique identifier; and wherein
  said new unique identifier particularly corresponding to said first particular node includes said information identifying said first particular node and time information indicative of a second particular time different than said first particular time.

26. A method for identifying failed computing nodes, said method comprising:
  providing a plurality of computing nodes, each computing node of said plurality of computing nodes having access to at least one hardware processor and to shared data storage;
  generating a first unique identifier particularly corresponding to a first particular node of said plurality of computing nodes;

generating a second unique identifier particularly corresponding to a second particular node of said plurality of computing nodes;

storing task information in said shared data storage, said task information indicative of a plurality of computing tasks each available to be completed by one of said plurality of computing nodes;

periodically updating node information in said shared data storage with new information associated with said first unique identifier;

accessing said shared data storage at a first time;

identifying a most recent update to said node information associated with said first unique identifier in said shared data storage;

determining whether said most recent update to said node information associated with said first unique identifier in said shared data storage occurred more than a threshold amount of time prior to said first time;

concluding, when said most recent update to said node information associated with said first unique identifier in said shared data storage occurred more than a threshold amount of time prior to said first time, that a first task identified by said task information as being processed by said first particular node is no longer being processed by said first particular node; and processing said first task that is concluded to be no longer being processed by said first particular node with a second particular node of said plurality of computing nodes; and said step of periodically updating said node information includes updating said node information with a new time stamp associated with said first particular node at a predetermined interval.

27. The method of claim 26, further comprising:
updating said task information to associate said first task with said second unique identifier to indicate said first task is being processed by said second node; and
periodically updating said node information in said shared data storage with new information associated with said second unique identifier.

28. The method of claim 26, wherein said task information includes a plurality of records, each record including:
a first field including information identifying a particular task;
a second field including information identifying a particular status associated with said particular task identified by said information of said first field; and
a third field including information identifying a particular node of said plurality of computing nodes associated with said particular task identified by said information of said first field; and further comprising
after concluding that said first task is no longer being processed by said first particular node, writing a record to said task information wherein said second field includes a status indicating that said first task is available to be processed by another computing node of said plurality of computing nodes; and
said step of determining and said step of writing said record are performed by a separate process apart from said first particular node and said second particular node of said plurality of computing nodes.

29. The method of claim 26, wherein said step of updating said node information with said new time stamp includes overwriting a prior time stamp associated with said first particular node with said new time stamp.

30. The method of claim 26, wherein said step of updating said node information with said new time stamp includes adding an additional node record different from said node record, said additional node record including said unique identifier and said new time stamp, and said node record including said unique identifier and a prior time stamp.

31. The method of claim 26, wherein said first unique identifier includes:
information identifying said first particular node; and
time information indicative of a first particular time.

32. The method of claim 31, further comprising:
after said step of concluding, generating a new unique identifier particularly corresponding to said first particular node of said plurality of computing nodes; and
updating said node information with said new unique identifier; and wherein
said new unique identifier particularly corresponding to said first particular node includes said information identifying said first particular node and time information indicative of a second particular time different than said first particular time.

33. A method for identifying failed computing nodes, said method comprising:
providing a plurality of computing nodes, each computing node of said plurality of computing nodes having access to at least one hardware processor and to shared data storage;

generating a first unique identifier particularly corresponding to a first particular node of said plurality of computing nodes;

generating a second unique identifier particularly corresponding to a second particular node of said plurality of computing nodes;

storing task information in said shared data storage, said task information indicative of a plurality of computing tasks each available to be completed by one of said plurality of computing nodes;

periodically updating node information in said shared data storage with new information associated with said first unique identifier;

accessing said shared data storage at a first time;

identifying a most recent update to said node information associated with said first unique identifier in said shared data storage;

determining whether said most recent update to said node information associated with said first unique identifier in said shared data storage occurred more than a threshold amount of time prior to said first time;

concluding, when said most recent update to said node information associated with said first unique identifier in said shared data storage occurred more than a threshold amount of time prior to said first time, that a first task identified by said task information as being processed by said first particular node is no longer being processed by said first particular node;

processing said first task that is concluded to be no longer being processed by said first particular node with a second particular node of said plurality of computing nodes;

after said step of concluding, generating a new unique identifier particularly corresponding to said first particular node of said plurality of computing nodes; and
updating said node information with said new unique identifier; and wherein said first unique identifier includes information identifying said first particular node, and time information indicative of a first particular time; and
said new unique identifier particularly corresponding to said first particular node includes said information identifying said first particular node and time information indicative of a second particular time different than said first particular time.

34. The method of claim 33, further comprising:
updating said task information to associate said first task with said second unique identifier to indicate said first task is being processed by said second node; and
periodically updating said node information in said shared data storage with new information associated with said second unique identifier.

35. The method of claim 33, wherein:
said task information includes a plurality of records, each record including
    a first field including information identifying a particular task,
    a second field including information identifying a particular status associated with said particular task identified by said information of said first field, and
    a third field including information identifying a particular node of said plurality of computing nodes associated with said particular task identified by said information of said first field; and further comprising
after concluding that said first task is no longer being processed by said first particular node, writing a record to said task information wherein said second field includes a status indicating that said first task is available to be processed by another computing node of said plurality of computing nodes; and
said step of determining and said step of writing said record are performed by a separate process apart from said first particular node and said second particular node of said plurality of computing nodes.

36. The method of claim 33, wherein:
said step of periodically updating said node information includes updating said node information with a new time stamp associated with said first particular node at a predetermined interval; and
said step of updating said node information with said new time stamp includes overwriting a prior time stamp associated with said first particular node with said new time stamp.

37. The method of claim 33, wherein:
said step of periodically updating said node information includes updating said node information with a new time stamp associated with said first particular node at a predetermined interval; and
said step of updating said node information with said new time stamp includes adding an additional node record different from said node record, said additional node record including said unique identifier and said new time stamp, and said node record including said unique identifier and a prior time stamp.

38. A multi-node computing system, comprising:
a plurality of computing nodes, each computing node of said plurality of computing nodes having access to associated node memory, for storing data and code, and at least one hardware processor configured to execute said code, said code including a set of native instructions configured to cause said at least one hardware processor to perform a corresponding set of native operations when executed by said at least one hardware processor; and
shared data storage accessible to each node of said plurality of computing nodes, said shared data storage including task information and node information, said task information indicative of a plurality of tasks each available to be processed by one of said nodes, said node information indicative of a status of each of said nodes; and wherein
said data and said code associated with a first one of said nodes include
    a first subset of said set of native instructions configured to generate a first unique identifier particularly corresponding to said associated first node,
    a second subset of said set of native instructions configured to periodically update said node information in said shared data storage with new information associated with said first unique identifier of said first node,
    a third subset of said set of native instructions configured to determine whether a first task, previously identified by said task information as being processed by another node, is available for processing by said first node, and
    a fourth subset of said set of native instructions configured to process said first task when it is determined to be available; and
said second subset of said set of native instructions is configured to periodically update said node information by storing new time information associated with said first node by said first unique identifier in said node information.

39. The system of claim 38, wherein said third subset of said set of native instructions is configured to:
access said shared data storage at a first time;
identify a most recent update to said node information by said another node;
determine whether said most recent update to said node information by said another node occurred more than a threshold amount of time prior to said first time; and
conclude, when said most recent update to said node information by said another node occurred more than said threshold amount of time prior to said first time, that said first task is no longer being processed by said another node.

40. The system of claim 38, wherein:
said system includes a third node configured to
    access said shared data storage at a first time,
    identify a most recent update to said node information by said another node,
    determine whether said most recent update to said node information by said another node occurred more than a threshold amount of time prior to said first time,
    conclude, when said most recent update to said node information by said another node occurred more than said threshold amount of time prior to said first time, that said first task is no longer being processed by said another node, and
    update a status identifier in said task information to indicate that said first task is available for processing; and
said third subset of said set of native instructions is configured to determine whether said first task is available for processing by said first node by checking said updated status identifier.

41. The system of claim 38, wherein said storing new time information includes overwriting previous time information associated with said first node by said first unique identifier in said node information.

42. The system of claim 38, wherein said storing said new time information includes storing said new time information in said node information such that said updated node information includes previous time information and said new time information associated with said first node by said first unique identifier.

43. The system of claim 38, wherein said first unique identifier includes:
   information identifying said first node; and
   time information indicative of a first time.

44. The system of claim 43, wherein, upon restart of said first node, said first subset of said set of native instructions is configured to generate a new unique identifier particularly corresponding to said associated first node, said new unique identifier including:
   said information identifying said first node; and
   new time information indicative of a second time different than said first time.

45. A multi-node computing system, comprising:
   a plurality of computing nodes, each computing node of said plurality of computing nodes having access to associated node memory, for storing data and code, and at least one hardware processor configured to execute said code, said code including a set of native instructions configured to cause said at least one hardware processor to perform a corresponding set of native operations when executed by said at least one hardware processor; and
   shared data storage accessible to each node of said plurality of computing nodes, said shared data storage including task information and node information, said task information indicative of a plurality of tasks each available to be processed by one of said nodes, said node information indicative of a status of each of said nodes; and wherein
   said data and said code associated with a first one of said nodes include
      a first subset of said set of native instructions configured to generate a first unique identifier particularly corresponding to said associated first node,
      a second subset of said set of native instructions configured to periodically update said node information in said shared data storage with new information associated with said first unique identifier of said first node,
      a third subset of said set of native instructions configured to determine whether a first task, previously identified by said task information as being processed by another node, is available for processing by said first node, and
      a fourth subset of said set of native instructions configured to process said first task when it is determined to be available;
   said first unique identifier includes information identifying said first node, and time information indicative of a first time;
   upon restart of said first node, said first subset of said set of native instructions is configured to generate a new unique identifier particularly corresponding to said associated first node; and
   said new unique identifier includes said information identifying said first node and includes new time information indicative of a second time different than said first time.

46. The system of claim 45, wherein said third subset of said set of native instructions is configured to:
   access said shared data storage at a first time;
   identify a most recent update to said node information by said another node;
   determine whether said most recent update to said node information by said another node occurred more than a threshold amount of time prior to said first time; and
   conclude, when said most recent update to said node information by said another node occurred more than said threshold amount of time prior to said first time, that said first task is no longer being processed by said another node.

47. The system of claim 45, wherein:
   said system includes a third node configured to
      access said shared data storage at a first time,
      identify a most recent update to said node information by said another node,
      determine whether said most recent update to said node information by said another node occurred more than a threshold amount of time prior to said first time,
      conclude, when said most recent update to said node information by said another node occurred more than said threshold amount of time prior to said first time, that said first task is no longer being processed by said another node, and
      update a status identifier in said task information to indicate that said first task is available for processing; and
   said third subset of said set of native instructions is configured to determine whether said first task is available for processing by said first node by checking said updated status identifier.

48. The system of claim 45, wherein:
   said second subset of said set of native instructions is configured to periodically update said node information by storing new time information associated with said first node by said first unique identifier in said node information; and
   said storing new time information includes overwriting previous time information associated with said first node by said first unique identifier in said node information.

49. The system of claim 45, wherein:
   said second subset of said set of native instructions is configured to periodically update said node information by storing new time information associated with said first node by said first unique identifier in said node information; and
   said storing said new time information includes storing said new time information in said node information such that said updated node information includes previous time information and said new time information associated with said first node by said first unique identifier.

* * * * *